(12) United States Patent
Chen et al.

(10) Patent No.: US 12,244,183 B2
(45) Date of Patent: Mar. 4, 2025

(54) ANGLE SENSOR DEVICE

(71) Applicant: Advanced Automation Group, Madison Heights, MI (US)

(72) Inventors: Shaotang Chen, Troy, MI (US); Dragan Andric, Clawson, MI (US)

(73) Assignee: ADVANCED AUTOMATION GROUP, Madison Heights, MI (US)

( * ) Notice: Subject to any disclaimer, the term of this patent is extended or adjusted under 35 U.S.C. 154(b) by 14 days.

(21) Appl. No.: 17/448,271

(22) Filed: Sep. 21, 2021

(65) Prior Publication Data
US 2023/0089358 A1    Mar. 23, 2023

(51) Int. Cl.
| | | |
|---|---|---|
| *H02K 11/225* | (2016.01) | |
| *G01B 7/30* | (2006.01) | |
| *G01D 5/20* | (2006.01) | |
| *H02P 6/16* | (2016.01) | |

(52) U.S. Cl.
CPC ............ *H02K 11/225* (2016.01); *G01B 7/30* (2013.01); *G01D 5/20* (2013.01); *H02P 6/16* (2013.01)

(58) Field of Classification Search
CPC .......... H02K 11/225; G01B 7/30; G01D 5/20; H02P 6/16
See application file for complete search history.

(56) References Cited

U.S. PATENT DOCUMENTS

| | | |
|---|---|---|
| 4,682,104 A | 7/1987 | Lombard et al. |
| 4,853,604 A | 8/1989 | McMullin et al. |
| 4,986,124 A | 1/1991 | Byrne et al. |
| 6,236,199 B1 | 5/2001 | Irle et al. |
| 6,304,076 B1 | 10/2001 | Madni et al. |
| 6,384,598 B1 | 5/2002 | Hobein et al. |
| 7,726,208 B2 | 6/2010 | Hoeller et al. |
| 8,453,518 B2 | 6/2013 | Diekmann et al. |
| 9,322,645 B2 | 4/2016 | Elpermann et al. |
| 9,914,477 B2 | 3/2018 | Shao et al. |
| 9,945,694 B2 | 4/2018 | Elpermann et al. |
| 2008/0007251 A1 | 1/2008 | Lee |
| 2011/0156699 A1* | 6/2011 | Shibata .................. G01D 5/202 324/207.25 |

(Continued)

FOREIGN PATENT DOCUMENTS

| | | |
|---|---|---|
| DE | 102018123294 A1 | 3/2020 |
| EP | 1312889 | 5/2003 |

OTHER PUBLICATIONS

Kamenicky, et al., An Inductive Position Sensor ASIC, AMI Semiconductor and Hella KG Hueck & Co, 21 pages, Czech Republic and Germany.

(Continued)

*Primary Examiner* — Akm Zakaria
(74) *Attorney, Agent, or Firm* — Burris Law, PLLC

(57) ABSTRACT

A position-torque sensor system includes two angle sensors configured to detect a rotational movement. Each of the two angle sensors includes a rotor and a stator. The rotor is rotatable in response to the rotational movement to provide a rotor rotational movement and is rotatable relative to the stator. The stator includes an excitation coil and a set of receiving coils that generate output signals indicative of the rotor rotational movement. The sets of receiving coils of the stators of the two angle sensors are structurally same and the rotors of the two angle sensors are structurally the same.

21 Claims, 5 Drawing Sheets

(56) References Cited

U.S. PATENT DOCUMENTS

| | | | |
|---|---|---|---|
| 2012/0330490 A1* | 12/2012 | Ozaki | ................ H02P 29/0241 |
| | | | 701/22 |
| 2020/0224725 A1 | 7/2020 | Obermann et al. | |
| 2021/0010793 A1 | 1/2021 | Irle et al. | |
| 2021/0010881 A1 | 1/2021 | Rle et al. | |
| 2021/0336514 A1* | 10/2021 | Godelar | ................ G01D 5/202 |

OTHER PUBLICATIONS

European Search Report and Written Opinion issued in corresponding EP Application No. 22196938, completed Feb. 13, 2023, 7 pages.

* cited by examiner

ANGLE SENSOR DEVICE

FIELD

The present disclosure relates to inductive position and/or torque sensors and more particularly, position and/or torque sensors having absolute angle sensors.

BACKGROUND

The statements in this section merely provide background information related to the present disclosure and may not constitute prior art.

Position and/or torque sensors can be used in various applications to determine an angular position and/or torque of a rotational movement applied to a shaft. For example, a torque sensor is commonly used in vehicle steering systems to detect rotational movement of a steering shaft and provide data indicative of the torque to a steering system controller, which in return adjusts power steering assist to the vehicle.

Position and/or torque sensors having absolute angle sensors in the form of inductive sensors generally detect angular positions of a rotating shaft to determine the torque being applied. More particularly, an inductive sensor can include a stator having a set of receiving coils, an excitation coil for generating an electromagnetic field, and a rotor having a target feature with same periodicity as the receiving coils. The rotor is arranged to rotate with the shaft and is rotatable relative to the stator. As it rotates, the target feature of the rotor influences the inductive properties of the receiving coils. A sensor circuit that is electrically coupled to the receiving coils receives an output signal that is indicative of the inductive properties and, based on the output signal, determines an angular position associated with the target feature and thus, the shaft.

In some applications, the torque sensor may employ two absolute angle sensors that have different structural periodicity to measure the torque. One angle sensor is used to measure the angular position at an input portion of the shaft and the other angle sensor is used to measure the angular position at an output portion of the shaft. Along with other information, the angular positions at the input portion and the output portion are used to determine the torque being applied.

SUMMARY

This section provides a general summary of the disclosure and is not a comprehensive disclosure of its full scope or all of its features.

In one form, the present disclosure is directed to a position-torque sensor system that includes two angle sensors, where each of the two angle sensors is configured to detect a rotational movement. Each of the two angle sensors includes a rotor and a stator that includes an excitation coil and a set of receiving coils. The rotor is rotatable in response to the rotational movement to provide a rotor rotational movement, and is rotatable relative to the stator. The set of receiving coils generate output signals indicative of the rotor rotational movement. The sets of receiving coils of the stators of the two angle sensors are structurally the same and the rotors of the two angle sensors are structurally the same.

In some variations, the position-torque sensor system further includes a sensor controller electrically coupled to the two angle sensors. The sensor controller is configured to receive the output signals from the set of receiving coils, and for each of the angle sensors, the sensor controller is configured to determine an angular position of the rotor rotational movement based on the output signals from the set of receiving coils of the angle sensor. In some variations, the sensor controller is further configured to provide an input voltage to the excitation coils of the two angle sensors. In some variations, the input voltage is a periodic voltage. In some variations, the sensor controller is further configured to determine a torque of the rotor rotational movement based on a displacement position between the angular positions of the rotor rotational movement. In some variations, the set of receiving coils includes at least two coils. In some variations the stators of the two angle sensors are provided on one or more circuit boards. In some variations, the position-torque sensor system further includes an electromagnetic barrier provided between the two angle sensors.

In one form, the present disclosure is directed to a position-torque sensor system that includes two angle sensors, where each of the two angle sensors is configured to detect a rotational movement. Each of the two angle sensors includes a rotor and stator that includes an excitation coil and a set of receiving coils configured to have sinusoidal windings. The rotor is rotatable in response to the rotational movement to provide a rotor rotational movement, and is rotatable relative to the stator. The set of receiving coils generate output signals indicative of the rotor rotational movement, and the sets of receiving coils of the stators of the two angle sensors are structurally same and the rotors of the two angle sensors are structurally the same.

In some variations, the position-torque sensor system further includes a sensor controller electrically coupled to the two angle sensors, where the sensor controller is configured to determine a characteristic of the rotor rotational movement based on the output signals. In some variations, the sensor controller is configured to determine, for each of the angle sensors, an angular position of the rotor rotational movement, as the characteristic, based on the output signals from the set of receiving coils for the angle sensor. In some variations, the sensor controller is further configured to determine a torque of the rotor rotational movement based on a displacement position between the angular positions of the rotor rotational movement. In some variations, the sensor controller is electrically coupled to the excitation coil of each of the two angle sensors to provide an input voltage signal to excitation coil. In some variations, the input voltage is a periodic voltage. In some variations, the stators of the two angle sensors are provided on one or more circuit boards. In some variations, the position-torque sensor system further includes an electromagnetic barrier provided between the two angle sensors. In some variations, the set of receiving coils of the stator includes two or more coils.

In one form, the present disclosure is directed to a position-torque sensor system includes two angle sensors and a sensor controller. Each of the two angle sensors is configured to detect a rotational movement and each of the two angle sensors includes a rotor and a stator. The rotor is rotatable in response to the rotational movement to provide a rotor rotational movement, and is rotatable relative to the stator. The stator includes an excitation coil and a set of receiving coils configured to have sinusoidal windings. The set of receiving coils generate output signals indicative of the rotor rotational movement. The sets of receiving coils of the stators of the two angle sensors are structurally same and the rotors of the two angle sensors are structurally the same. The stators of the two angle sensors are provided on one or more circuit boards. The sensor controller is electrically coupled to the two angle sensors. The sensor controller is configured to determine, for each of the angle sensors, an angular position of the rotor rotational movement based on the output signals from the at least two receiving coils of the angle sensor.

In some variations, the sensor controller is further configured to determine a torque of the rotor rotational movement based on a displacement position between the angular positions. In some variations, the position-torque sensor system further includes an electromagnetic barrier provided between the two angle sensors.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
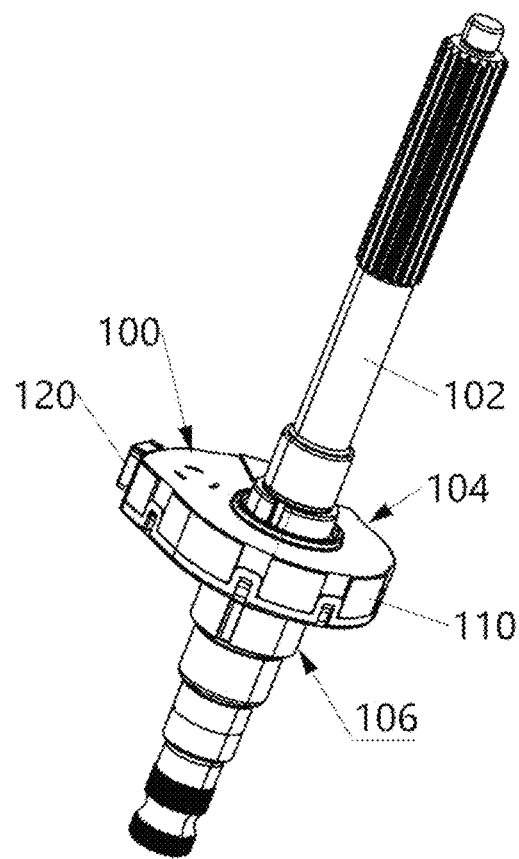
FIG. 1 is a perspective view of a position-torque sensor system provided on a shaft in accordance with the teaching of the present disclosure.
Figure 2:
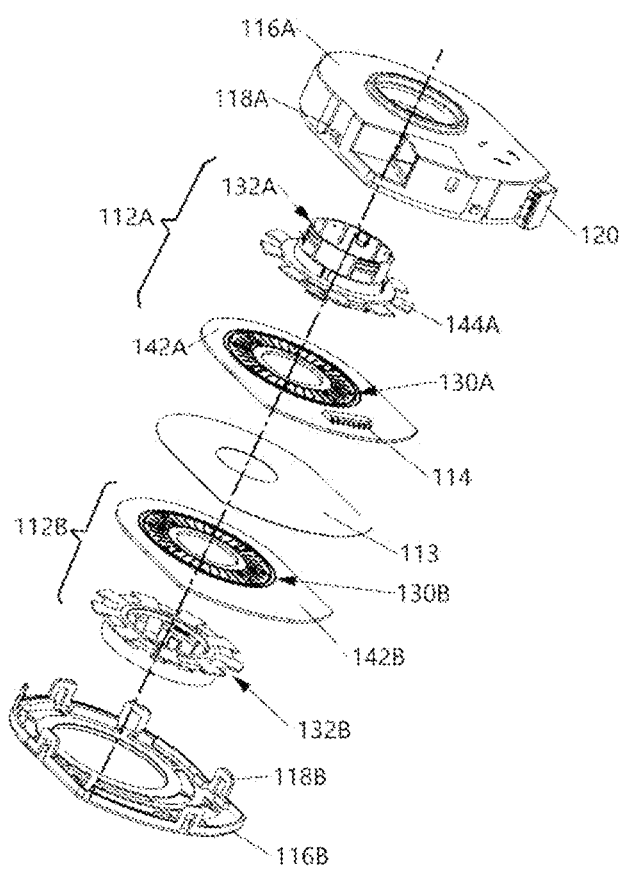
FIG. 2 is an exploded view of the position-torque sensor system of FIG. 1.
Figure 3:
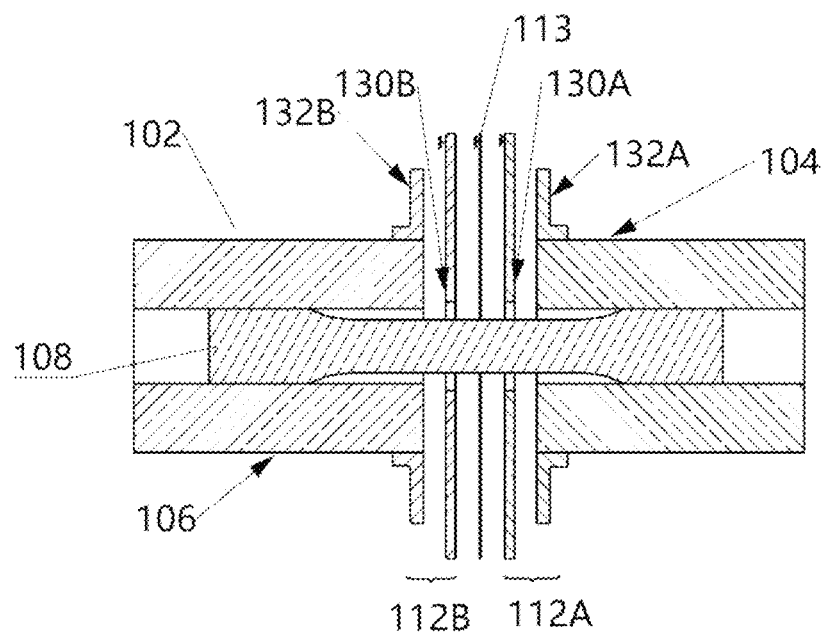
FIG. 3 is partial cross-sectional view of the position-torque sensor system.
Figure 4:
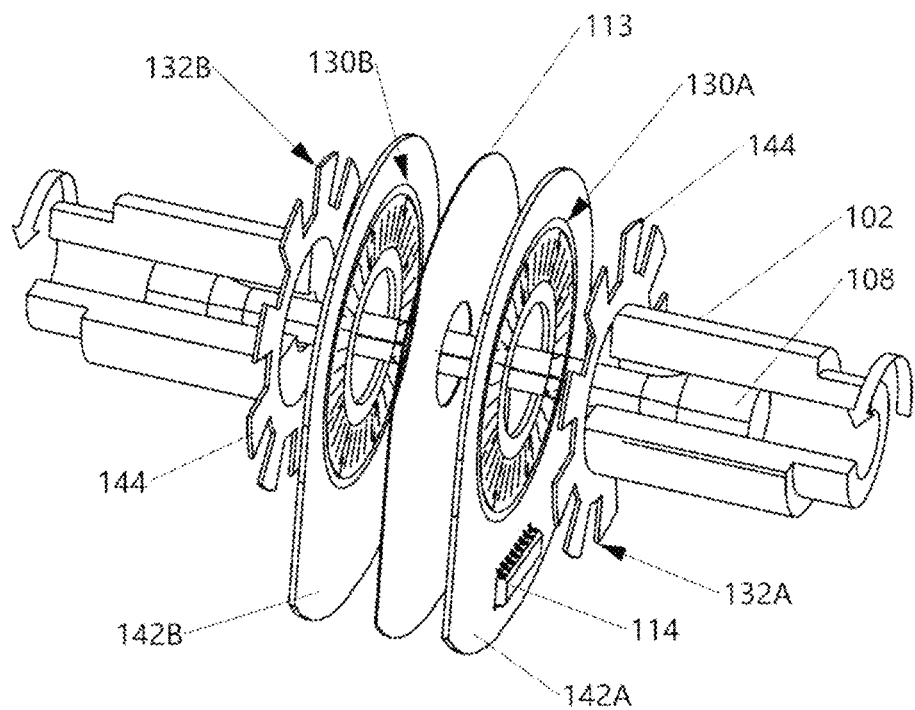
FIG. 4 is an exploded partial cross-sectional view of the position-torque sensor system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

To reduce the size of position and/or torque sensors, two angular sensors are typically placed in close proximity to one another. As a result, electromagnetic field from an input shaft angular sensor couples to that of an output shaft angular sensor, reducing the accuracy of differential angle or torque. To alleviate such interference, some position and/or torque sensors employ two angle sensors with two different receiving geometries and two different coupling elements, in that the periodicity of the winding structures of the receiving coils is different and has an integer relationship that is greater than one in the two receiving geometries. Two different coupling structures with different periodicity can increase the complexity and cost as two different winding and target structures employ two different tooling.

A position-torque sensor system of the present disclosure is configured to detect angular positions of a rotating shaft and further determine torque being applied by employing two inductive angular sensors that have same structural configuration with respects to rotors and stators provided therein. Output signals from the angular sensors are processed by a sensor controller to determine the angular positions and torque being applied. To reduce interference, in one form, an electromagnetic (EM) barrier is provided between the two inductive angular sensors. By employing angular sensors having the same structure, the position-torque sensor system may reduce complexity of the system, of signal processing, and/or of forming the system. It should be readily understood that the benefits and features of the position-torque sensor system of the present disclosure should not be limited to examples provided here.

Referring to FIGS. 1 to 6, a position-torque sensor system 100 of the present disclosure is arranged and secured to a shaft 102 having an input portion 104 and output portion 106. In an example application, the shaft 102 is part of a steering column of a vehicle (not shown), where the input portion 104 receives a rotational movement from a steering wheel coupled to the steering column and the output portion 106 transfers the rotational movement to a power assist steering (PAS) system, such as an electric powered assist steering system. In one form, the shaft 102 includes a torsion bar 108 that connects between the input portion 104 and the output portion 106 and twists due to the rotational movement. The amount of torque applied to the torsion bar 108 is substantially equal to the amount of torque applied to the steering wheel minus the torque applied to the output portion 106. Based on the torque of the torsion bar 108, a control system of the PAS system provides power assist to move the steering wheel of the vehicle. It should be readily understood that while the position-torque sensor system 100 is described with respect to a PAS system application, the position-torque sensor system 100 of the present disclosure can be employed in other applications and is not limited to a PAS system.

In one form, the position-torque sensor system 100 includes a housing 110, two inductive angle sensors 112A and 112B (collectively "angle sensors 112"), an electromagnetic (EM) barrier 113, and a sensor controller 114. The housing 110 is configured to house the components of the position-torque sensor system 100, such as the angle sensors 112, the EM barrier 113, and the sensor controller 114. The housing 110 may be a multi-piece structure that can be assembled and secured together to form the housing 110. For example, in FIG. 2, the housing 110 includes two structural members 116A and 116B (collectively "structural members 116") that define a cavity (not shown) for housing the components of the position-torque sensor system 100. In one form, the structural members 116 have snap-in features 118A and 118B that are configured to engage with each other to secure the structural members 116 together. Other fastening methods may be employed, such as welding, chemical adhesives, bolts, screws, among others. In one form, the housing 110 includes an input-output interface 120 to electrically couple the sensor controller 114 to an external controller.

In one form, the angle sensors 112 are absolute angle sensors and are configured to generate output signals indicative of angular movement of the shaft 102. More particularly, the angle sensors 112 are coaxially arranged with the shaft 102 and specifically, with the torsion bar 108. In one form, the angle sensor 112A is arranged at the input portion 104 of the torsion bar 108 (i.e., input angle sensor 112A), and the angle sensor 112B is arranged at the output portion 106 of the torsion bar 108 (i.e., output angle sensor 112B).

In one form, the angle sensors 112A, 112B are the same or have similar structural configuration. Accordingly, for purposes of brevity, details regarding the configuration of the angle sensor 112A are provided herein and are also applicable to the angle sensor 112B. Components of the input angle sensor 112A and the output angle sensor 112B may also be distinguished from one another by using the term input or output and/or characters "A" and "B" respectively.

Figure 5:
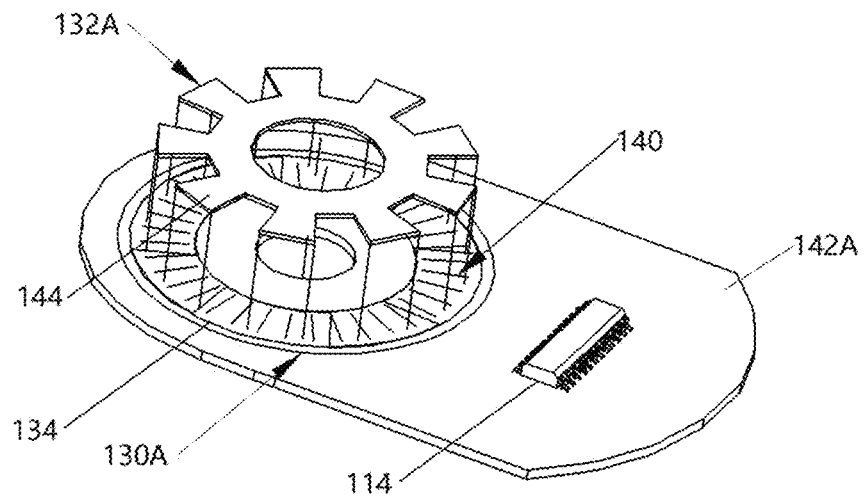
FIG. 5 illustrates a rotor and a printed circuit board having a stator of the position-torque sensor system in accordance with the teaching of the present disclosure.
Figure 6:
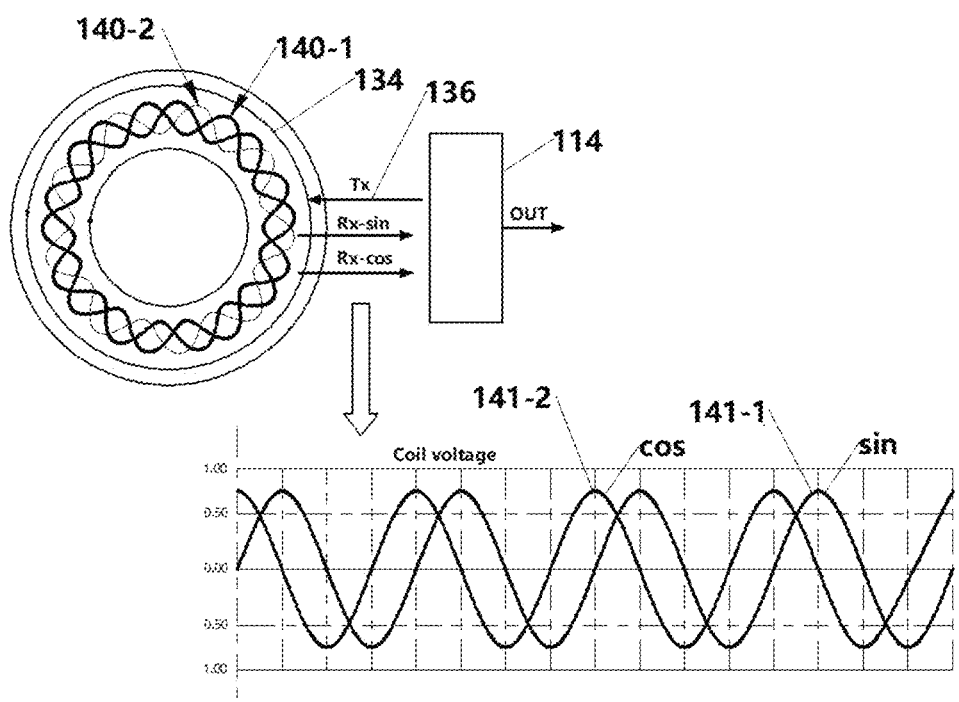
FIG. 6 illustrates the stator having an excitation coil and a set of receiving coils in correlation with angle signals associated with the receiving coils in accordance with the teaching of the present disclosure.

The angle sensor 112A includes a stator 130A and a rotor 132A that is rotatable relative to the stator 130A. In one form, as represented in FIGS. 5 and 6, the stator 130A includes an excitation coil 134 (i.e., one or more excitation coils) and a set of receiving coils 140-1 and 140-2 (i.e., two or more receiving coils, collectively "receiving coils 140"). The excitation coil 134 is electrically coupled to the sensor controller 114 to receive an alternating voltage signal, which is generally identified by reference character 136. In a non-limiting example, the excitation coil 134 may be provided circumferential around the receiving coil(s) 140 of the stator 130A. The excitation coil 134 generates and/or enhances an electromagnetic (EM) field and thus, exciting the inductive coupling between the stator 130A and the rotor 132A of the angle sensor 112A.

The receiving coils 140 are provided as periodic windings, such as, triangular, circular, or sinusoidal windings. In one form, each of the receiving coils 140-1, 140-2 are electrically coupled to the sensor controller 114 to provide an output signal that is indicative of the angular position of the rotor 132A and more particularly, of the input portion 104 of the torsion bar 108. The output signal can be provided as an output voltage that is associated with an oscillating waveform with its amplitude modulated by angular position of the rotor (i.e., rotor angle). For example, as illustrated in FIG. 6, the receiving coil 140-1 provides an output signal that is associated with a sine-function 141-1 of the rotor angle (i.e., sine relationship 141-1) and the receiving coil 140-2 provides an output signal that is associated with a cosine-function 141-2 of the rotor angle (i.e., cosine relationship 141-1). Additional details regarding the correlation of the output signals and the rotor angle (i.e., angular position of the rotor) are provided below. While two receiving coils 140 are illustrated, the stator 130A may include additional receiving coils 140 to improve accuracy of the angular position.

The rotor 132A is rotatable relative to respective stator 130A and responsive to the rotational movement exerted on to the shaft 102 and more particularly, in the example application, the torque applied the torsion bar 108. That is, the rotor 132A is rotatable in response to the rotational movement to provide a rotor rotational movement. The rotor 132A includes target features 144 radially extending and circumferentially distributed about the rotor 132A. The target features 144 are configured to have the same periodicity as the receiving coils 140. In addition, the target features 144 are configured to rotate relative to the receiving coils 140 and pass over the receiving coils 140 influencing inductive coupling between the receiving coils 140 and the excitation coils 134. More particularly, the target features 144 are designed to alter the inductive coupling and thus, voltage amplitude of the output AC signal. The number of target features 144 and the distribution of the target features 144 should not be limited to the configuration provided in the figures.

In the figures, the angle sensor 112B includes a stator 130B and a rotor 132B, which are configured in a similar manner as the stator 130A and rotor 132A (e.g., receiving coils for both stators 130 are provided as sinusoidal windings and target features of rotors 132 are same). In one form, using known techniques, each of the stators 130A and 130B are provided on a printed circuit board (PCB) 142A and 142B (see FIGS. 2, 3, and 4).

The EM barrier 113 is configured to isolate EM fields generated by respective angle sensors 112 and thus, reduce or inhibit crosstalk between the two angle sensors 112. In one form, the EM barrier 113 is provided between the angle sensors 112 and more particularly, between the stators 130A, 130B. In one form, the EM barrier 113 is made of copper, brass, nickel, or other suitable metal material. In an example application, the EM barrier 113 is a discrete separate component provided between the PCB 142A, 142B.

The sensor controller 114 is electrically coupled to the angular sensors 112 to provide power (e.g., an input voltage) and process the output signals from the angle sensors 112 to determine an angular position/movement of the rotor 132 (i.e., angular position of the rotor rotational movement), which is indicative of the angular position/movement of the shaft 102. Specifically, the rotational movement applied to the shaft 102 is indicative of an angular movement of the rotor 132 (i.e., rotor rotational movement) relative to the stator 130. The sensor controller 114 is configured to determine the angular position detected by each of the angle sensors 112 and further determine the torque based on a difference between the angular positions and other information (e.g., characteristics of the torsion bar).

Figure 7:
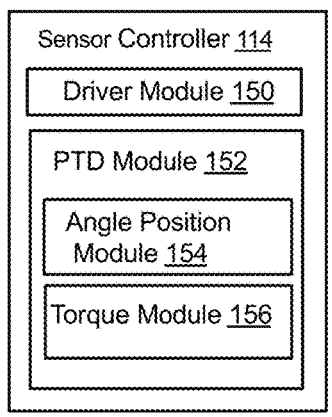
FIG. 7 is a block diagram of a sensor controller in accordance with the teaching of the present disclosure.
Figure 8:
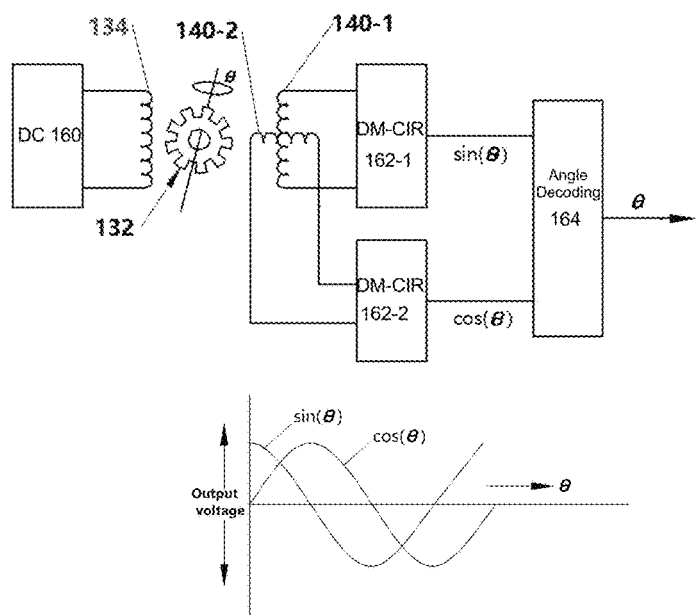
FIG. 8 illustrates a block diagram of the stator and the rotor in association with the sensor controller in accordance with the teaching of the present disclosure.
Figure 9:
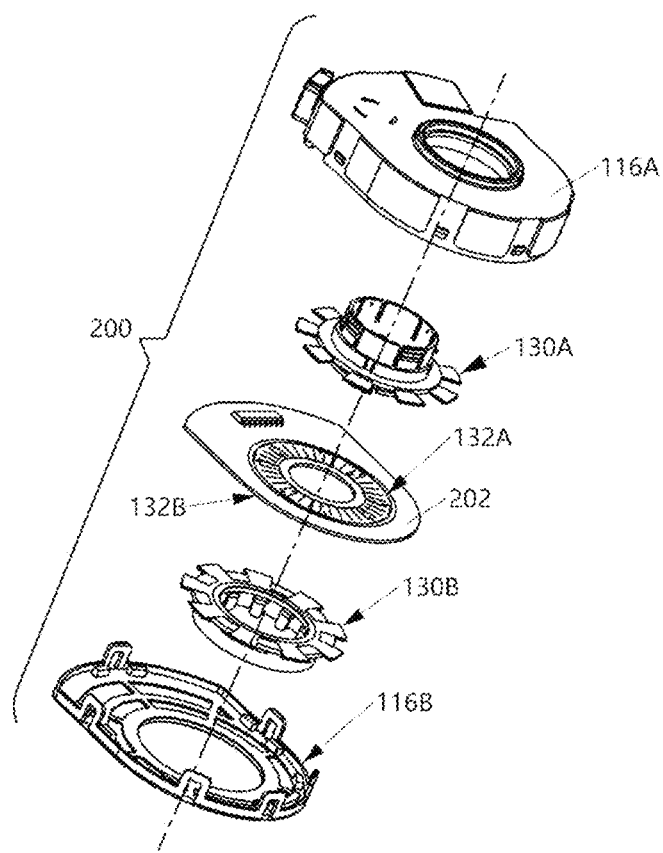
FIG. 9 is an exploded view of a position-torque sensor system having an integrated printed circuit board with stators for both angle sensors in accordance with the teaching of the present disclosure.

Referring to FIGS. 7, 8, and 9, in one form, the sensor controller 114 includes a driver module 150 and a position-torque determination (PTD) module 152. The driver module 150 is configured to generate and provide power to the excitation coils 134 of the stators 130, and more particularly, provide a periodic voltage signal. For example, the periodic voltage signal has an alternating current (AC) frequency source having an oscillatory waveform, such as a periodic square waveform or sinusoidal waveform. Among other components, the driver module 150 may include known coil drivers for providing requisite power to the excitation coils 134.

In one form, the PTD module 152 is configured to include an angle position module 154 and a torque module 156. In one form, the angle position module 154 is configured to perform signal analysis on the output signals from the receiving coils 140 of the stators 130 to determine absolute angular positions of the rotors 132 and more specifically, the input portion 104 and the output portion 106 of the torsion bar 108. To process the output signals, the angle position module 154 may include filters for removing noise, demodulation circuits, and/or decoders, among other signal processing components and/or software.

More particularly, referring to FIG. 8, the excitation coil 134 and the receiving coils 140 of the stator 130A, the rotor 132A, and the angle position module 154 of the sensor controller 114 are provided. The excitation coil 134 is coupled to a driver circuit (DC) 160, which forms part of the driver module 150, to provide power (e.g., input voltage) to the excitation coils 134. Among other components, the angle position module 154 includes demodulation circuits (DM Cir.) 162-1 and 162-2 (collectively demodulation circuits 162) that are coupled to the receiving coils 140-1 and 140-2, respectively.

In operation, the angle sensor 112A operates as a rotary transformer with one primary excitation coil and two secondary coils (i.e., receiving coils 140). The mutual coupling between the excitation coil 134 and receiving coils 140 is modulated by the target features 144 of the rotor 132A causing two output signals to vary with angle in a sinusoidal way. In the example provided, the demodulation circuits 162 are configured to provide voltage amounts indicative of the amplitude associated with the angular position of the rotor 132A (i.e., θ) and the sine relationship 141-1 and cosine relationship 141-2. The angle position module 154 further includes an angle decoder (164) that receives the data from the demodulation circuits 162 and is configured to determine the angular position of the rotor 132A and thus, the input portion of the torsion bar 108. Accordingly, the voltages of the output signals are mapped to respective waveforms and the angular position (i.e., θ) can be determined. A similar processing is performed for the output signals from the stator 130B of the angle sensor 112B to determine the angular position of the rotor 132B. In the following, the angular position of the rotor 132A is provided $\theta_A$ and angular position of the rotor 132B is $\theta_B$.

Using the angular positions ($\theta_A$ and $\theta_B$), the torque module 156 is configured to determine the torque of the torsion bar 108 and thus, the shaft 102. In one form, the torque module 156 is configured to determine the torque based on a difference between the angular positions detected by the angle sensors 112 and characteristics of the torsion bar 108. That is, the torque module 156 determines a displacement angle/position (i.e., $\theta_D$, $\theta_D = \theta_A - \theta_B$) and thus, the torque.

The sensor controller 114 can be provided at the same location or distributed at different locations and communicably coupled accordingly. For example, the sensor controller 114 may include, for each angle sensor 112, a drive circuit and circuitry indicative of the angle position module 154, which are arranged at the PCBs 142A and 142B having the stators 130A and 130B, respectively. The function of the torque module 156 may be provided at one of the PCBs where the torque module 156 is communicable coupled to the circuitry of the angle position modules 154. In another example, the function of the torque module 156 may be provided at the external system controller, which is communicably coupled to the angle position module(s) 154 to receive the angular position. In yet another example, the controller 114 may be fully provided outside of the housing at the external controller and is electrically coupled to the angle sensors 112 via the input-output interface 120. Accordingly, the sensor controller 114 may be configured in various suitable ways and should not be limited to the examples provided herein. In addition, in the figures, the reference character 114 is used to identify one or more components that make up the sensor controller 114 and is not intended to convey that the entire features of the sensor controller 114 is provided at the illustrated location.

Figure 10:
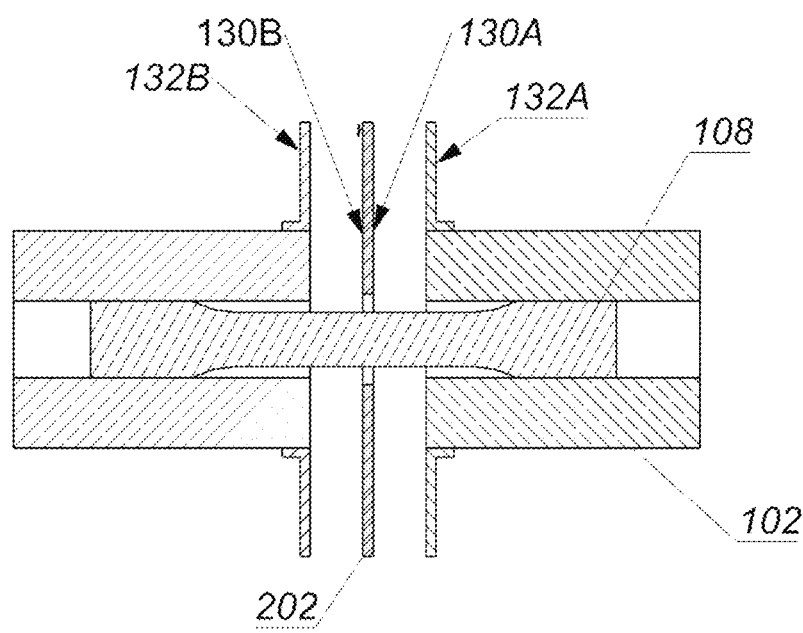
FIG. 10 is a partial cross-sectional view of the position-torque sensor system having the integrated printed circuit board with the stators in accordance with the teaching of the present disclosure.

In one variation, the stators 130 of the angle sensors 112 may be provided on a single PCB assembly. For example, referring to FIGS. 9 and 10, a position-position-torque sensor system 200 is configured to include one PCB 202 that includes the stator 130A on a first side of the PCB assembly 202 and the stator 130B on a second side of the PCB assembly 202 opposite of the first side. Accordingly, while not illustrated, the excitation coil and receiving coils of the stator 130A is provided on the first side and the excitation coil and the receiving coils of the stator 130B are provided on the second side. In addition, the features of the sensor controller 114 may be distributed on the first side, the second side or a combination thereof of the PCB assembly 202. While not shown, the EM barrier 113 may be integrated within the PCB assembly 202 to reduce the EM interference.

In another variation, a sinusoidal winding configuration of receiving coils as shown in FIG. 6 is preferred to other types of winding configuration such as triangular or circular. With sinusoidal windings, the output signals of the receiving coils follow a sinusoidal relationship with the rotor angular position, reducing the computation complexity of the rotor angular position calculation or decoding. With sinusoidal winding configuration of receiving coils 140, interference from the neighboring angular sensor has a fundamental sinusoidal content without any harmonics. The sinusoidal winding configuration reduces amount of interference and thus, improves accuracy among different winding configurations. In addition, the sensor controller 114 may be configured to perform additional filtering to reduce such interference of the output signals from the receiving coils 140 from each of the stators 130 and further improve accuracy of rotor position detection. Furthermore, the set of receiving coils 140 of the stators 130 having the sinusoidal windings may be configured in a way to cancel interference between the two angle sensors 112. As such, EM barrier 113 may not be employed in the position-torque sensor system 100 or 200. In yet another variation, the two angle sensors 112 may be arranged to be separated by a set distance, where the set distance is defined to inhibit interference between the EM fields. Thus, in such arrangement, the position-torque sensor system of the present disclosure may not include the EM barrier 113.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A position-torque sensor system comprising:
two angle sensors, wherein each of the two angle sensors is configured to detect a rotational movement and each of the two angle sensors is aligned on an axis of the rotational movement, wherein each of the two angle sensors comprises:
a rotor rotatable in response to the rotational movement to provide a rotor rotational movement; and
a stator that comprises an excitation coil and a set of receiving coils, wherein:
the rotor is rotatable relative to the stator,
the set of receiving coils generate output signals indicative of the rotor rotational movement, wherein the output signals are based on an inductive coupling of the excitation coil and the set of receiving coils, and wherein the inductive coupling traverses an axial distance in parallel with the axis, and
the sets of receiving coils of the stators of the two angle sensors are structurally the same and the rotors of the two angle sensors are structurally the same.

2. The position-torque sensor system of claim 1 further comprising:
a sensor controller electrically coupled to the two angle sensors, wherein:
the sensor controller is configured to receive the output signals from the set of receiving coils, and
for each of the angle sensors, the sensor controller is configured to determine an angular position of the rotor rotational movement based on the output signals from the set of receiving coils of the angle sensor.

3. The position-torque sensor system of claim 2, wherein the sensor controller is further configured to provide an input voltage to the excitation coils of the two angle sensors.

4. The position-torque sensor system of claim 3, wherein the input voltage is a periodic voltage.

5. The position-torque sensor system of claim 2, wherein the sensor controller is further configured to determine a torque of the rotor rotational movement based on a displacement position between the angular positions of the rotor rotational movement.

6. The position-torque sensor system of claim 1, wherein the set of receiving coils comprises at least two coils, and wherein the axial distance is bounded by the rotor and the stator.

7. The position-torque sensor system of claim 1, wherein the stators of the two angle sensors are provided on one or more circuit boards.

8. The position-torque sensor system of claim 1 further comprising an electromagnetic barrier provided between the two angle sensors.

9. A position-torque sensor system comprising:
two angle sensors, wherein each of the two angle sensors is configured to detect a rotational movement, wherein each of the two angle sensors comprises:
a rotor rotatable in response to the rotational movement to provide a rotor rotational movement; and
a stator that comprises an excitation coil and a set of receiving coils configured to have sinusoidal windings, the sinusoidal windings comprising at least two windings with a fixed phase or a position shift to each other, wherein:
the rotor is rotatable relative to the stator and a maximum outer diameter of the rotor is greater than a minimum inner diameter of the sinusoidal windings,
the set of receiving coils generate output signals indicative of the rotor rotational movement, and
the sets of receiving coils of the stators of the two angle sensors are structurally the same and the rotors of the two angle sensors are structurally the same.

10. The position-torque sensor system of claim 9, wherein a sensor controller electrically coupled to the two angle sensors is configured to determine, for each of the angle sensors, an angular position of the rotor rotational movement, as a characteristic of the rotor rotational movement, based on the output signals from the set of receiving coils for the angle sensor.

11. The position-torque sensor system of claim 10, wherein the sensor controller is further configured to determine a torque of the rotor rotational movement, as the characteristic, based on a displacement position between the angular positions of the rotor rotational movement.

12. The position-torque sensor system of claim 10, wherein the sensor controller is electrically coupled to the excitation coil of each of the two angle sensors to provide an input voltage signal to the excitation coils, wherein the input voltage is a periodic voltage.

13. The position-torque sensor system of claim 9, wherein the sinusoidal windings comprises a first sinusoidal winding and a second sinusoidal winding, and wherein the first sinusoidal winding comprises a first phase with respect to an origin and the second sinusoidal winding comprises a second phase with respect to the origin, and further wherein an intersection of the first sinusoidal winding and the second sinusoidal winding is based on the first phase and the second phase.

14. The position-torque sensor system of claim 9, wherein the stators of the two angle sensors are provided on one or more circuit boards.

15. The position-torque sensor system of claim 9 further comprising an electromagnetic barrier provided between the two angle sensors.

16. The position-torque sensor system of claim 9, wherein the set of receiving coils of the stator comprises two or more coils.

17. A position-torque sensor system comprising:
two angle sensors, wherein each of the two angle sensors is configured to detect a rotational movement, wherein each of the two angle sensors includes comprises:
a rotor rotatable in response to the rotational movement to provide a rotor rotational movement; and
a stator that comprises an excitation coil and a set of receiving coils configured to have sinusoidal windings, the sinusoidal windings comprising at least two windings with a fixed phase or a position shift to each other, wherein:
the rotor is rotatable relative to the stator and a maximum outer diameter of the rotor is greater than a minimum inner diameter of the sinusoidal windings, and
the set of receiving coils generate output signals indicative of the rotor rotational movement; and
a sensor controller electrically coupled to the two angle sensors, wherein:

the stators of the two angle sensors are structurally the same and the rotors of the two angle sensors are structurally the same, the sets of receiving coils of the stators of the two angle sensors are provided on one or more circuit boards, and the sensor controller is configured to determine, for each of the angle sensors, an angular position of the rotor rotational movement based on the output signals from the set of receiving coils of the angle sensors.

18. The position-torque sensor system of claim 17, wherein the sensor controller is further configured to determine a torque of the rotor rotational movement based on a displacement position between the angular positions.

19. The position-torque sensor system of claim 17 further comprising an electromagnetic barrier provided between the two angle sensors.

20. The position-torque sensor system of claim 17, wherein a first output signal of the output signals is based on a first phase and a second output signal of the output signals is based on a second phase, and wherein the sinusoidal windings comprises a first sinusoidal winding and a second sinusoidal winding, and further wherein the first sinusoidal winding comprises a first phase with respect to an origin and the second sinusoidal winding comprises a second phase with respect to the origin, and further wherein an intersection of the first sinusoidal winding and the second sinusoidal winding is based on the first phase and the second phase.

21. The position-torque sensor system of claim 13 further comprising a sensor controller electrically coupled to the two angle sensors, wherein the sensor controller is configured to determine a characteristic of the rotor rotational movement based on the output signals, and wherein a first output signal of the output signals is based on the first phase and a second output signal of the output signals is based on the second phase.

* * * * *